UNITED STATES PATENT OFFICE.

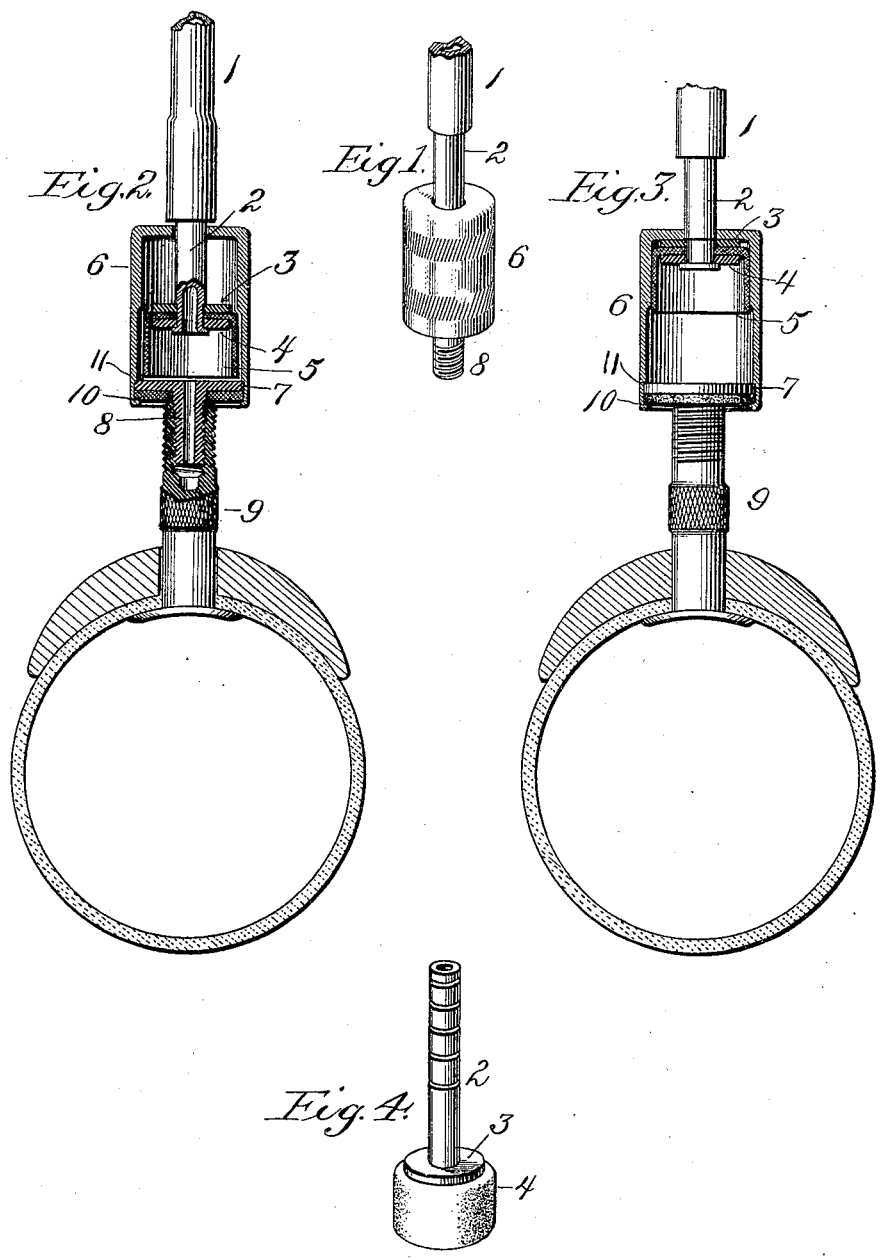

CHARLES L. TRAVIS, OF MINNEAPOLIS, MINNESOTA.

COUPLING FOR PIPES OR TUBES.

SPECIFICATION forming part of Letters Patent No. 629,705, dated July 25, 1899.

Application filed October 27, 1898. Serial No. 694,734. (No model.)

*To all whom it may concern:*

Be it known that I, CHARLES L. TRAVIS, a citizen of the United States, residing at Minneapolis, in the county of Hennepin and State of Minnesota, have invented certain new and useful Improvements in Couplings for Pipes or Tubes, of which the following is a specification.

This invention relates to connections or couplings for pipes or tubes, and more particularly to such as are employed for connecting the air-tube of a bicycle-pump with the nipple of a pneumatic tire. It is, however, to be understood that while this is the primary purpose of the invention the coupling may be used for any and all purposes to which it is suited.

In the accompanying drawings, Figure 1 is a perspective view of the improved coupling as it appears when ready for use, the drawing showing said coupling somewhat larger than it is made in practice for bicycle-pumps. Fig. 2 is a sectional view showing the coupling adjusted for attachment to the nipple of a tire; Fig. 3, a similar section with the parts adjusted to the position which they assume when air is being forced into the tire; Fig. 4, a perspective view of the cup-leather and the tubular stem to which the same is applied.

It is desirable in couplings of this character that the member or portion having the threaded neck to enter the nipple be capable of ready turning to permit it to be screwed into the threaded mouth of the nipple and that at the same time it be air-tight or proof against escape of the air passing from the pump to the tire. With the coupling as commonly constructed these results are not perfectly attained, and where provision is made for the free turning of the threaded member independently of the tube to which it is attached there is a liability of the swiveled portion becoming detached and lost from its companion parts. The present invention aims to remedy this difficulty and to produce a swivel which may be turned with perfect freedom, yet so made as to preclude any escape of air at either end of the coupling.

The invention is susceptible of some modification as to the details with reference more particularly to the mode of assembling the parts, but in its preferred form is constructed as shown in the accompanying drawings.

Referring to the drawings, 1 indicates the tube or pipe through which air is conveyed from a pump or reservoir to the tire or to the coupling connecting said tube with the tire. Extending into the delivery end of the pipe or tube 1 is a tubular stem 2, carrying at its lower end two washers 3 and 4, between which is clamped a cup-leather 5, the open end of the cup being turned downward or in the direction in which the air travels.

6 indicates a shell or body which is represented as of cylindrical form and is preferably so made, within which shell the cup-leather is arranged, the tubular stem 2 passing out through a central opening in the otherwise-closed end of the shell 6, as shown. The internal diameter of the shell 6 varies, the upper half of its interior, or about one-half, being of smaller diameter than the remaining half, as clearly indicated in Figs. 2 and 3, said smaller diameter being such as to receive but to form a reasonably close fit about the cup-leather 5. The lower or larger portion of the shell is of such diameter as to permit the cup-leather to occupy it without making contact with its inner walls or contacting so lightly therewith as to afford no hindrance to the rotation of the shell about and relatively to the cup-leather. The walls of the two sections of the shell join each other in an easy curve or bevel, so that the cup-leather may pass from the larger into the smaller without danger of cutting or abrasion and without liability of locking or engaging therewith. The lower end of the shell 6, viewing the parts in the position indicated in Figs. 1, 2, and 3, is bored or reamed out to a slightly-larger diameter than the lower or larger chamber of the cylinder for the purpose of receiving a disk 7, formed with a projecting neck 8, which is externally threaded to fit the internal mouth of the nipple 9 of a pneumatic tire or other part with which the coupling is to make connection.

Encircling the neck 8 and resting directly against the outer or lower face of the disk 7 is a packing-disk 10 of rubber, leather, or other suitable packing material. This packing-disk and the disk 7 behind it are both firmly secured in place by turning or spinning inward the thin edges of the open end of the shell or cylinder 6, as shown in Figs. 2 and 3, the shoulder 11, formed by reaming or counterboring the end of the cylinder, preventing the disks 7 and 10 from being forced inward beyond the predetermined point. In this way I am enabled to make a tight joint and lasting closure of the shell or cylinder 6 and at the same time to secure in place a packing which when the coupling is firmly screwed down upon or into the nipple 9 bears upon the end of said nipple and makes an air-tight joint at that point even though the threads be comparatively loose and free.

The device being thus constructed, its operation is as follows: Assuming that it be desired to couple the pipe or tube 1 with the nipple 9 of a tire, the shell 6 is pushed upward or backward on the stem 2 until the cup-leather 5 enters and occupies the enlarged chamber or portion of the shell 6, as indicated in Fig. 2. When in this position, the shell may be freely turned about the stem 2, since the opening through which said tube passes is large and free enough to permit such free rotation and the cup-leather is at the time out of contact or in very light contact with the interior of the shell. The neck 8, which is by reason of the mode of its attachment to the shell practically an integral part thereof, of course turns with the shell, so that it may be readily and firmly screwed into the nipple 9. When the connection is thus firmly made and the packing-disk 10 is brought to bear closely against the end of the nipple, so that no air may escape at that point, the tube 2 is drawn upward or outward with reference to the shell or cylinder 6, thus carrying the cup-leather into the smaller chamber or reduced portion of the shell or cylinder 6, as shown in Fig. 3, where it makes quite close contact with the walls of the shell. Air being forced into and through the pipe or tube 1 exerts an outward pressure upon the cup-leather and causes it to fit firmly and snugly against the inner walls of the shell and thus insures an absolutely air-tight packing of the connection between the tube 2 and the shell or cylinder.

The connection between the cup-leather and the tube 2 is preferably formed by slightly reducing or necking down the lower end of the tube, placing thereon the washer 3, then the cup-leather 5, and lastly the washer 4, and spinning or turning over the end of the tube upon said washer 4, as shown in Fig. 2. By applying the proper pressure and thus spinning over or flanging down the end of the tube 2 the washers are caused to compress the central portion of the cup-leather so firmly and the turned-over end of the tube lies so closely against the face of the washer that no air can escape between the tube and the washers or cup-leather.

It is obvious that the threaded neck 8 might be formed upon the closed end of the shell or cylinder 6 and the tubular stem 2 be carried out through a disk secured in the open end of the shell or cylinder 6 in the manner in which the disks 10 and 11 are secured therein under the construction represented. Such construction is not, however, deemed as satisfactory as that shown and will not, therefore, be adopted ordinarily; but such mere reversal of parts is to be understood as being comprehended within my invention.

In the foregoing description I have referred to the neck 8 as being threaded externally to gage to fit the nipples of regular necks or tires; but it is obvious that the form of this neck is immaterial and that it may be made tapering and without threads, if preferred, as is now frequently done, with a view to adapting the neck to couplings of varying bore.

It is not essential that the packing 5 be in the form of a cup-leather, as a simple disk will give fairly good results; but the cup-leather is deemed much the more satisfactory.

Having thus described my invention, I claim—

1. The herein-described coupling, consisting of a hollow shell or cylinder 6, having its interior portion of varying diameters; a tube passing through one end of said shell or cylinder and provided with a cup-leather; and a tubular neck carried by the opposite end of said shell or cylinder and adapted to make connection with a nipple or other part, substantially as set forth.

2. In a coupling, the combination of an outer shell or member having different portions of its length of varying or different internal diameters; a tubular stem passing through one end of said shell or cylinder; and a packing carried by said stem within the shell or cylinder and movable therein from a portion having one diameter to a portion having a different diameter.

3. In a swiveled coupling, the combination of a hollow shell of varying internal diameter; and a tubular stem provided with a packing movable lengthwise of the shell or cylinder whereby it may be moved to a portion of relatively larger diameter to facilitate the turning of the shell and then drawn into a portion of smaller diameter to effect a tight fitting or packing of the parts.

4. In a coupling of the character described, a hollow shell or cylinder having a rigid head provided with a projecting neck; a yielding packing-disk encircling said neck and resting directly against the rigid head; and a lip or edge turned inward from the cylinder to bear upon and confine the edges of the packing, substantially as described.

5. The combination of tubular stem 2 provided with disks 3 and 4, and cup-leather 5; shell 6 having its interior of different diameters and provided with shoulder 11; disk 7 resting upon said shoulder and provided with neck 8; and packing-disk 10 resting upon the disk 7 and secured in place by the inturned end or edges of the shell 6.

In witness whereof I hereunto set my hand in the presence of two witnesses.

CHARLES L. TRAVIS.

Witnesses:
HORACE A. DODGE,
DUDLEY E. BURDINE.